May 16, 1933.  I. LUNDGAARD  1,909,875
REFRIGERATOR
Filed Aug. 31, 1929   3 Sheets-Sheet 1
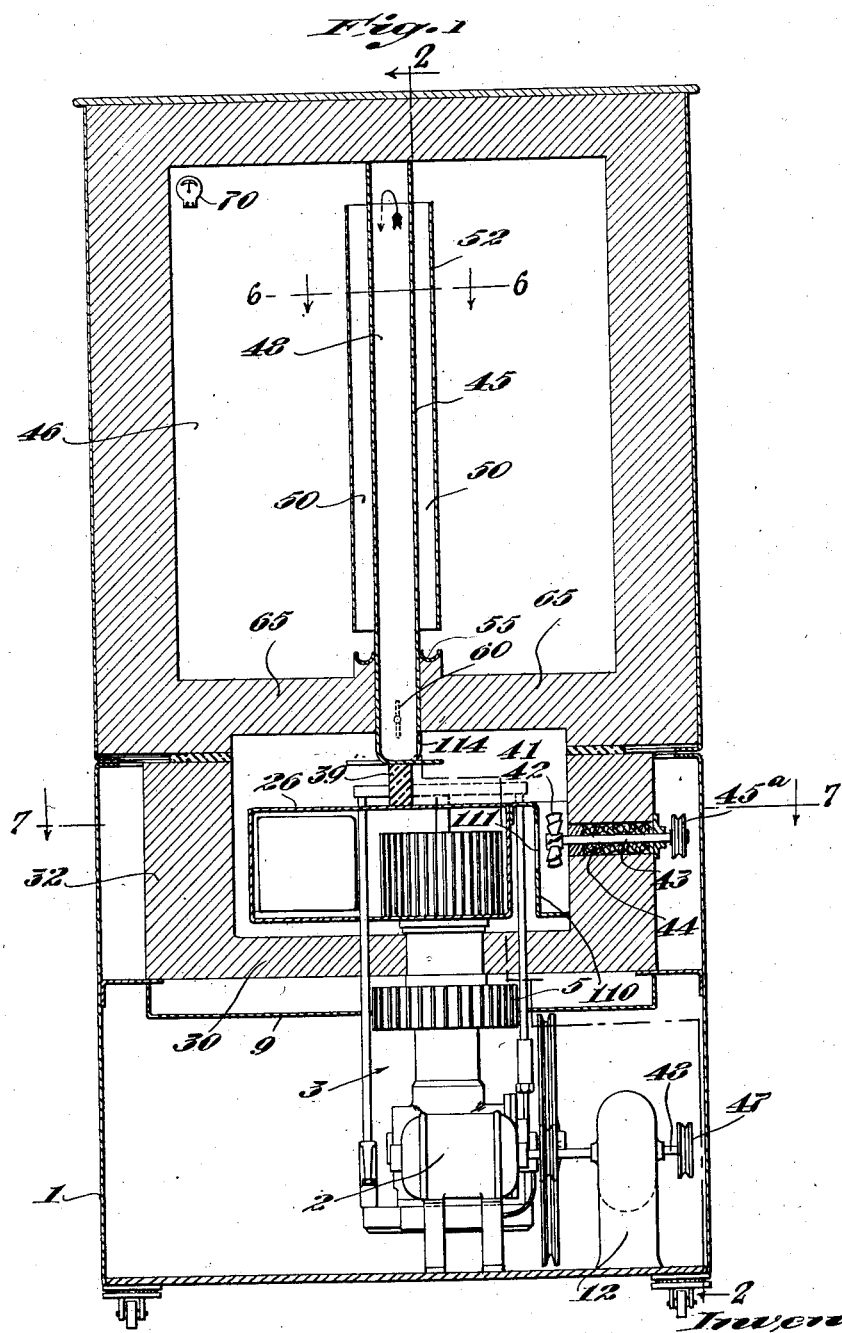

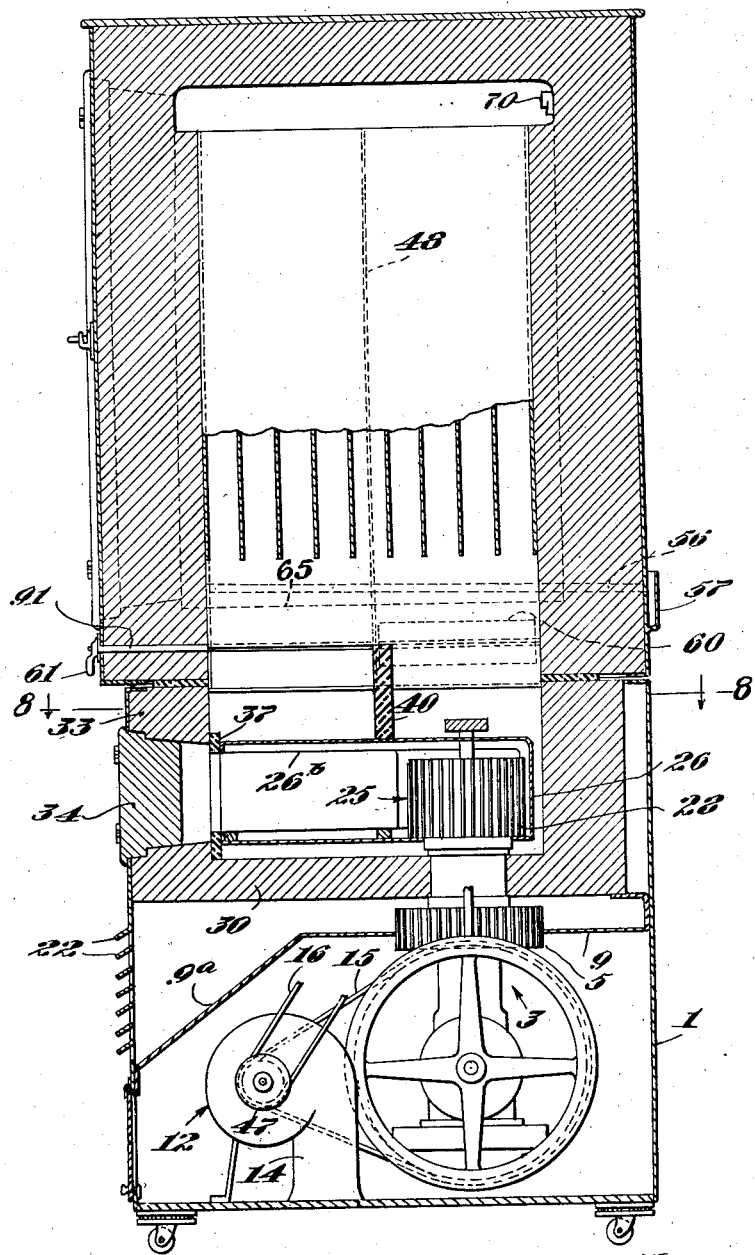

May 16, 1933.　　　I. LUNDGAARD　　　1,909,875
REFRIGERATOR
Filed Aug. 31, 1929　　　3 Sheets-Sheet 3
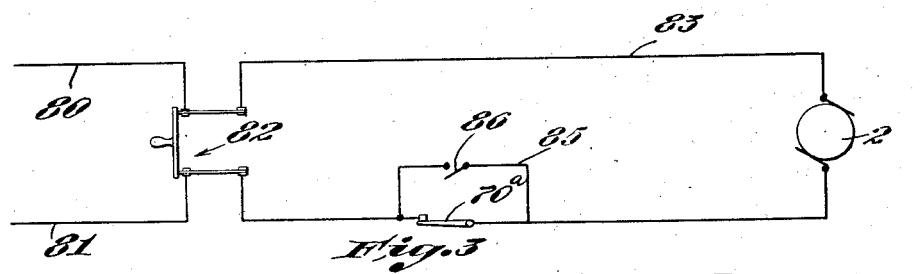
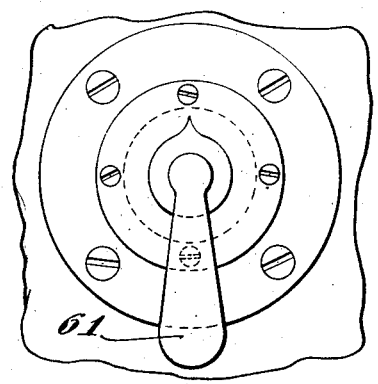
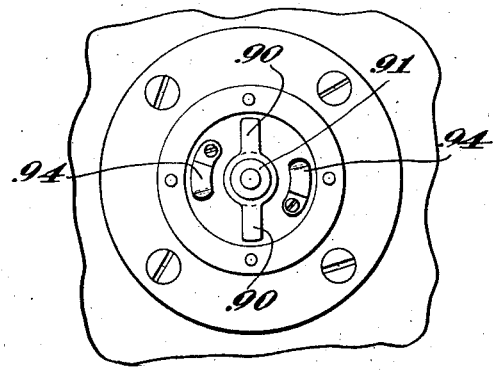
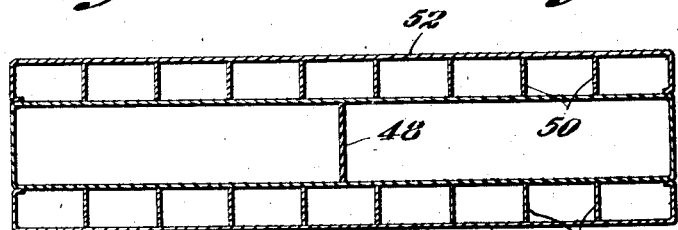
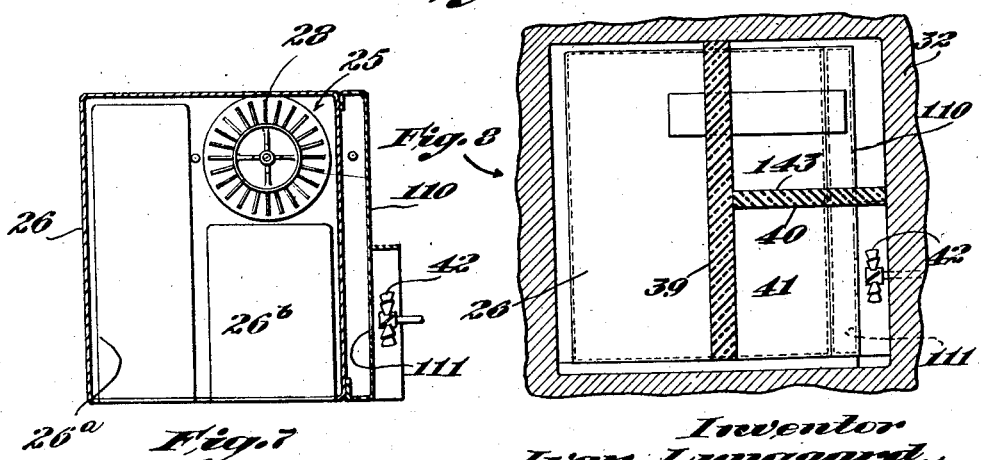

Patented May 16, 1933

1,909,875

UNITED STATES PATENT OFFICE

IVAR LUNDGAARD, OF WORCESTER, MASSACHUSETTS, ASSIGNOR TO DEVON MANUFACTURING COMPANY, OF BOSTON, MASSACHUSETTS, A CORPORATION OF MASSACHUSETTS

REFRIGERATOR

Application filed August 31, 1929. Serial No. 389,641.

This invention relates to improvements in refrigeration, and particularly to refrigerating apparatus for houshold purposes and a corresponding method of refrigeration.

My prior application, Serial No. 102,983, filed April 19, 1926, now U. S. Patent No. 1,787,584, granted January 6, 1931, discloses a refrigerating machine having a cold end in juxtaposition to a fluid duct through which a suitable circulating medium, such as air, may be impelled by a fan or the like. The present invention provides an improved refrigerating arrangement of this general character and particularly permits the attainment of a low temperature under all conditions for the freezing of ice cubes, desserts, and the like, while permitting the maintenance of a refrigerating temperature in the food compartment which may be considerably higher. Furthermore, in accordance with the present invention an adjustable control is provided to permit the selective variation of the temperature differential between the freezing chambers and the food compartment. Accordingly, a thermostat in the food compartment normally controls the operation of the refrigerating machine, but when the temperature of the food compartment falls, due to exterior low temperatures, the thermostat may be short circuited to permit the continued running of the refrigerating machine to impart the desired freezing temperature to the freeing chambers. Under these conditions the flow of the circulating medium from the region of the cooling chambers to the food compartment preferably is interrupted, and, in accordance with the preferred embodiment of the invention, there in an insulating wall between the freezing chambers and the food compartment; accordingly, under substantially all conditions the freezing compartment may be maintained at a desired low temperature while the food compartment may be maintained at a suitably higher refrigerating temperature, and, even should the exterior temperature become so low that it would ordinarily impede continued operation of the refrigerating machine, this effect may be avoided by the special control means provided herewith. Furthermore, the present invention is particularly effective in permitting the employment of low freezing temperatures in one part of a refrigerator for the preparation of ice cubes, freezing desserts or the like, while permitting a substantially higher temperature in the food compartment without having any portion of the wall of the latter or any cooling element in direct heat transfer relation thereto at a temperature as low as freezing temperature. In other words, the food compartment may be provided with a cooler which has a relatively large heat transfer area and which therefore need not have a temperature materially lower than that at which the food compartment should be maintained, i. e., substantially above freezing; accordingly, there is but little tendency for moisture to collect upon this cooler, with consequent objectionable dehydration of food, and there is substantially no occurrence of frost in the food compartment under normal operating conditions. As a result, the moisture thus collected may readily be removed from the food compartment and, in accordance with the preferred embodiment of the invention, may be readily dissipated without necessity for drain connections with the water piping or the like. Furthermore, the present invention provides a unique arrangement for draining collected moisture from the food compartment and exhausting the same from the food compartment without necessity for drain connections with the water piping or the like.

To attain these desirable advantages, I preferably provide a liquid containing cooler disposed about the cold end of the machine and associated with or providing suitable freezing compartments for the manufacture of ice cubes, frozen desserts, or the like. This arrangement permits the very rapid manufacture of ice cubes or the ready preparation of desserts which require a very low temperature for their proper preparation, such as ice creams which are free from gelatins or the like. A suitable duct preferably is arranged in juxtaposition to the liquid containing cooler and to the food compartment, and means are provided such as an impeller to cause the circulation of fluid through this duct, thus causing the conduction of heat from the food compartment to the cooler. Preferably the impeller is driven synchronously with the refrigerating machine so that this circulation continues while the machine is operating, but when the machine stops only natural circulation of the fluid takes place, and accordingly the temperature of the liquid containing cooler is not greatly raised during the periods in which the machine shuts down. As the temperature rises in the food compartment the thermostat acts to restart the machine and the impeller.

In the preferred embodiment of this invention, the duct for the circulating medium preferably may contain air and may form a portion of a central cooling partition of relatively large area between separate chambers in the food compartment. Preferably this duct is so arranged and sealed that the intrusion of atmospheric air and consequent formation of frost is prevented. Preferably suitable heat conductive elements extend outwardly from this partition in order to aid the conduction of heat from the interior of the food chambers to the duct and suitable troughs may be disposed below these heat conductive elements to receive moisture therefrom. These troughs preferably are connected to a receptacle which is exposed to the air at the exterior of the machine, thus permitting evaporation of the condensate and avoiding the necessity for special drain pipes or the like.

In order to permit the uttermost flexibility in refrigerating systems provided by apparatus of this character, a suitable control member, such as a damper, preferably is disposed within the duct for the circulating medium and is movable in response to an exterior control. When this damper is arranged in its open position, there is a minimum differential between the temperature of the food compartment and the liquid containing cooler or freezing chamber, and when the damper is moved substantially to its closed position, this temperature differential is much greater, thus causing a relatively lower temperature in the freezing compartment and greater freezing capacity. Under these conditions, the refrigerating machine will run for a relatively greater proportion of the time under the control of the thermostat in the food compartment to maintain the latter at its proper temperature. When the damper is entirely closed, means preferably are provided concomitantly to effect the closing of a switch in a shunt that is in parallel with the thermostat so that the refrigerating machine will continue to operate despite a low temperature within the food compartment. This arrangement is intended primarily to permit the preparation of frozen desserts or ice cubes when the exterior temperature is so low that the food compartment might remain at a sufficiently low temperature for long periods without the thermostat causing the operation of the refrigerating machine.

A refrigerator constructed in accordance with the present invention may be readily arranged so that it may be manufactured and transported in two separate sections which may be assembled in operative position to each other by merely superimposing them in proper relation.

In the accompanying drawings, which exemplify a concrete embodiment of the invention;

Fig. 1 is a vertical section through a household refrigerator constructed in accordance with this invention;

Fig. 2 is a vertical section of such a refrigerator taken approximately on the line 2—2 of Fig. 1;

Fig. 3 is a wiring diagram showing the arrangement of the leads for the driving motor, thermostat, and the like;

Fig. 4 is an exterior view of the cold control mechanism;

Fig. 5 is an elevational view of a part of the same, certain other parts being removed;

Fig. 6 is a section on line 6—6 of Fig. 1, showing the arrangement of the intermediate partition;

Fig. 7 is a horizontal section of the liquid containing cooler, taken on the line 7—7 of Fig. 1, showing the freezing compartments and cold end of the refrigerating machine associated therewith; and Fig. 8 is a horizontal section of the refrigerator above the liquid containing cooler taken on the line 8—8 of Fig. 2.

In the accompanying drawings, the numeral 1 designates a compartment at the bottom of the refrigerator which contains the motor 2 which drives the refrigerating machine 3. Preferably this refrigerating machine may be of the general character disclosed and described in my Patent No. 1,240,862 which employs air as a mediating fluid that circulates between the hot and cold ends of a single cylinder. The hot end of this cylinder is designated by the numeral 5, being provided with suitable fins which extend through an opening in a partition 9 that extends across the chamber 1 at the lower part of the refrigerator. Preferably a suitable draft inducing factor 12 is connected to the motor 2 and is provided with a duct 14 having an opening at the bottom of the refrigerator. Suitable louvers 22 may be arranged in one wall of the compartment 1 above a downwardly and forwardly inclined portion 9$^a$ of the partition 9 so that air may be circulated from one side of this partition about the fins 5 to the other side thereof; thus, for example, the air may enter between the louvers 22, may pass downwardly through the opening in partition 9 and the passages between fins 5, through the blower 12 and thence to the outlet duct 14. Thus the hot portion of the machine is cooled. A suitable driving connection such as a belt 15 is provided to permit the operation of the refrigerating machine by driving motor 2.

The upper end of the refrigerating machine which comprises the cold head 25 is provided with suitable fins 28 of heat conductive material that are disposed in one part of a suitable liquid containing cooler 26. This cooler may contain a suitable liquid such as ethylene glycol and thus is adapted to retain for a relatively long time the low temperature imparted thereto by the cold head 25 while the machine is in operation. The cooler 26 may be provided with a reentrant freezing compartment 26$^a$ extending substantially to the rear wall of the cooler and with a second compartment 26$^b$ extending back to the region of the cold head 25 of the refrigerating machine. As shown, suitable space for the circulation of the ethyl glycol or the like is provided about and between chambers 26$^a$ and 26$^b$. These chambers are obviously adapted to receive suitable receptacles, dishes, drawers, or the like, which may be inserted when door 34 is opened.

Preferably a layer 30 of heat insulating material, which may form the bottom of a box-like container 32 for cooler 26, is disposed between the chamber 1 at the base of the cabinet and the cooler 26. The front of the latter is juxtaposed to the front wall 33 of this portion of the refrigerator, which is provided with a suitable door or closure 34, affording independent access to the freezing compartments which preferably are formed in the cooler itself. Suitable sealing strips 37 preferably are arranged between the cooler and the inner edge of the door so that the circulation of air between the inside of this portion of the refrigerator housing and the atmosphere is prevented and consequent objectionable frosting avoided.

A suitable strip 39 of compressible material extends between the front and back walls of the refrigerator housing and divides the space above cooler 26 into two portions; one of these portions is divided into front and rear parts by a partition 40. Thus the partitions 39 and 40 cooperate with the box-like member 32 in forming a compartment 41 at the front right corner of the refrigerator. The side of the cooler adjoining this partition is connected to a sheet metal wall 110 which cooperates with the cooler in providing an air duct having an opening 111 aligned with an impeller 42. The latter is mounted upon a shaft 43 extending through the wall of casing 32 and provided with packing 44. A pulley 45$^a$ upon this shaft is connected by a belt 16 with a pulley 47 upon the drive shaft 48 whereby the fan is operated in synchronism with the refrigerating machine.

The chamber 41 communicates through an opening 114 with the lower part of the front portion of an intermediate hollow partition 45 which extends upwardly into the food compartment 46 that occupies the upper part of the refrigerator. Preferably partition 45 separates the food compartment into two separate portions or chambers, as shown. An internal wall 48 within hollow partition 45 may extend from the bottom of the same to a point spaced somewhat below its top, thus dividing the hollow partition into two separate duct portions. The rear part of the partition communicates with the space above the cooler 26, which is at the left of the partition 39, Figs. 1 and 8. This space communicates about the bottom of the cooler with the open lower portion of the passage provided by member 110, and the space within this duct communicates through opening 111 with the impeller 42 and the chamber 41.

A suitable coolant, such as air which is hermetically sealed from the exterior atmosphere, passes upwardly under the action of fan 42 through chamber 41 into the front part of hollow partition 45, passing over the top of the internal wall 48 within the same and downwardly through its rear half and thence to the space at the left of member 39. The coolant may then pass downwardly about the sides and front and rear of the cooler, sweeping past the major portion of its surface and flowing through the opening 111 provided by member 110 to the impeller 42 and thus completing the circuit. It is thus evident that the partition 45 forms a cooler for the food compartment.

In order to enhance the conduction of heat from the food chambers to partition 45, the latter preferably carries a plurality of outwardly extending fins 50 which support a suitable sheet 52 of metal at their outer ends. Preferably the fins and the member 52 terminate short of both the upper and lower horizontal walls of the food chamber, thus providing passages for the circulation of air in each of these chambers.

Since the passages thus provided form the portions of the chamber at the lowest temperature, they will normally collect the moisture that is deposited in the food compartment. I provide suitable troughs 55 disposed below the fins 50 and connected through suitable passages 56 with a receptacle 57 which may extend along the back of the refrigerator and contain liquid that is exposed to the atmosphere and thus readily vaporizes. Since the partition 45 and the heat conductive elements carried thereby have a relatively large area, the temperature of the same need not be materially lower than that at which the food compartment is to be maintained. For example in many installations a difference of no more than 10° F. is satisfactory. Under ordinary operating conditions, therefore, the temperature of the partition 45 will never fall to the freezing temperature of water and there will be no collection of frost upon the same. The somewhat lower temperature of this member than that of the remainder of the food compartment will cause the collection of some moisture, which flows downwardly; troughs 55 disposed beneath the fins 50 collect this moisture and are connected through suitable passages 56 with a receptacle 57 which may extend along the back of the refrigerator. The liquid in this receptacle is exposed to the atmosphere and is thus readily vaporized. Since the temperature of the cooler 45 may be relatively high, the amount of moisture collecting on the same is comparatively small and the dissipation of this moisture by vaporization may be readily effected. Thus the receptacle 57 only need expose a comparatively small liquid surface to the atmosphere.

In order to permit a ready variation in the temperature differential between the food compartments and the freezing chamber, a damper 60 preferably is disposed at the lower portion of the rear passage within partition 45, a suitable handle 61 being provided upon the front of the machine to permit ready control of this damper. Obviously when the damper is opened the temperature differential between the food chamber and the freezing compartments will be at its lowest and the freezing capacity of the machine may only be sufficient for ordinary requirements. Under these conditions a greater proportion of the total refrigerating capacity is imparted to the food compartment and accordingly the thermostat 70 in this compartment causes the operation of the refrigerating machine for the minimum amount of time. As the damper 60 is moved toward its closed position, this temperature differential increases and a greater proportion of the total refrigerating effect is imparted to the cooler 26, thus greatly increasing its freezing capacity. Since other conditions being equal, the food compartment continues to require the same refrigerating capacity to maintain its proper temperature, the machine is then operated a greater proportion of the time. When the damper is entirely shut, the conduction of heat from the food compartment to the freezing compartment and the cooler 26 is impeded, since heat insulating partitions 65 are disposed at the bottom of each of the food chambers.

The closing of the damper is adapted concomitantly to cause the closing of a switch in a shunt disposed about the thermostat 70 so that the motor 2 and the refrigerating machine will be driven independently of the effect of the thermostat under these conditions. Thus the freezing capacity of the machine may be maintained, although exterior atmospheric conditions would otherwise cause the temperature of the food compartment to be so low that the thermostat 70 would not be effective in causing the operation of the machine for a sufficient portion of the time to maintain the desired lowered temperature of the freezing compartment.

Fig. 3 is a wiring diagram illustrating the arrangement of the control leads for the driving motor 2. The leads 80 and 81 may extend from the opposite sides of the supply line and be connected to a main control switch 82, one side of this switch being connected by a lead 83 to the motor 2, and the other side thereof being connected to switch 70ª controlled by thermostat 70 in the food compartment. A shunt 85 is disposed in parallel with switch 70ª and includes a switch 86 that is operable upon closing of the damper to effect the operation of the machine independently of the thermostat.

Fig. 5 illustrates the arrangement of this switch, which comprises a pair of diametrically opposed contact members 90 secured to the shaft 91 that operates the damper 60, there being a pair of fixed contacts 94 connected to the lead 85 so that, when the members 90 engage these contacts, the current will pass through the shunt 85 independently of the thermostatically controlled switch 70ª.

In the preferred structural embodiment of this invention the metal wall of the chamber 1 is extended up to enclose the freezing compartments 32, these compartments being transported as a single unit. The food compartments 46 and the partition 45 may be included in a second unit which may be separately transported. The second unit may readily be assembled with the first by more superimposition upon the same, the compressible gaskets between the units permitting their ready assembly in this manner, and the sealing of the air chambers about the cooler 26.

From the foregoing it is evident that I have provided a refrigerating machine providing an unusually satisfactory and effective control of the temperature of the various portions of the machine under all conditions and permitting a desirable variation in these conditions. The present invention, while permitting the freezing of ice cubes or desserts at a temperature below the freezing point of water, provides a cooler for the food compartment which is at a relatively high temperature and thus causes only slight dehydration of stored food products. Accordingly, objectionable excessive drying of such food stuffs is avoided, and there is no collection of frost and consequently no necessity for defrosting; furthermore, the limited quantity of moisture that is collected may readily be dissipated by exterior evaporation without the necessity of providing special drain connections or the like.

I claim:

1. A refrigerator comprising a food compartment, a refrigerating machine having a cold head, a liquid-containing cooler disposed in juxtaposition to said head, freezing chambers associated with said cooler, a fluid circulating duct having a portion juxtaposed to said cooler and a portion in juxtaposition to the food compartment, and a fluid impeller to circulate fluid through said duct whereby said fluid may receive heat from the food compartment without passing through the same.

2. A refrigerator comprising a food compartment, a refrigerating machine having a cold head, a liquid-containing cooler disposed in juxtaposition to said head, freezing chambers associated with said cooler, a fluid circulating duct having a portion juxtaposed to said cooler and a portion in juxtaposition to the food compartment, a fluid impeller to circulate fluid through said duct whereby said fluid may receive heat from the food compartment without passing through the same, said impeller being operable in synchronism with the refrigerating machine.

3. A refrigerator comprising a food compartment, a liquid-containing cooler, freezing chambers associated with said cooler, a fluid circulating duct having a portion juxtaposed to said cooler and a portion in juxtaposition to the food compartment, a fluid impeller to circulate fluid through said duct whereby said fluid may receive heat from the food compartment without passing through the same, and a layer of heat insulating material between the food compartment and cooler.

4. A refrigerator comprising a food compartment, a liquid-containing cooler, freezing chambers associated with said cooler, a fluid circulating duct having a portion juxtaposed to said cooler and a portion in juxtaposition to the food compartment, a fluid impeller to circulate fluid through said duct whereby said fluid may receive heat from the food compartment without passing through the same, and a damper in said duct to control the flow of fluid.

5. A refrigerator comprising a food compartment, a refrigerating machine having a cold head, a liquid-containing cooler disposed in juxtaposition to said head, freezing chambers associated with said cooler, a fluid circulating duct having a portion juxtaposed to said cooler and a portion in juxtaposition to the food compartment, a fluid impeller to circulate fluid through said duct whereby said fluid may receive heat from the food compartment without passing through the same, and a damper in said duct to control the flow of fluid.

6. A refrigerator comprising a food compartment, a refrigerating machine having a cold head, a liquid-containing cooler disposed in juxtaposition to said head, freezing chambers associated with said cooler, a fluid circulating duct having a portion juxtaposed to said cooler and a portion in juxtaposition to the food compartment, a fluid impeller to circulate fluid through said duct whereby said fluid may receive heat from the food compartment without passing through the same, said impeller being operable in synchronism with the refrigerating machine, and a thermostat in the food compartment controlling the operation of the machine and impeller.

7. A refrigerator comprising a food compartment, a refrigerating machine having a cold head, a liquid-containing cooler disposed in juxtaposition to said head, freezing chambers associated with said cooler, a fluid circulating duct having a portion juxtaposed to said cooler and a portion in juxtaposition to the food compartment, a fluid impeller to circulate fluid through said duct, said impeller being operable in synchronism with the refrigerating machine, a thermostat in the food compartment controlling the operation of the machine and impeller, a damper in the duct to control the flow of fluid therethrough, and means associated with the damper to vary the controlling effect of the thermostat.

8. A refrigerator comprising a food compartment, a refrigerating machine having a cold head, a liquid-containing cooler disposed in juxtaposition to said head, freezing chambers associated with said cooler, a fluid circulating duct having a portion juxtaposed to said cooler and a portion in juxtaposition to the food compartment, a fluid impeller to circulate fluid through said duct, said impeller being operable in synchronism with the refrigerating machine, a thermostat in the food compartment controlling the operation of the machine and impeller, a damper in the duct, a motor driving the machine, and electrical leads controlled by the thermostat to operate the motor, a shunt extending about the thermostat and connected to the leads, a switch in said shunt controlled by the damper to permit continued operation of the machine by actuation of the damper independently of the thermostat.

9. A refrigerator comprising a food compartment, a liquid-containing cooler, freezing chambers associated with said cooler, a fluid circulating duct having a portion juxtaposed to said cooler and a portion in juxtaposition to the food compartment, a fluid impeller to circulate fluid through said duct, and a layer of heat insulating material between the food compartment and cooler, and an intermediate partition in said food compartment, said duct extending through said partition.

10. In a refrigerator, a bipartite food compartment with a central hollow partition therein, and means for circulating a coolant through said central partition, troughs adjoining the lower portion to the opposite faces of the partition and extending through the wall of the food compartment, and a receptacle exposed to the air and connected to the troughs, whereby condensed moisture from the troughs is evaporated into the atmosphere.

11. In a refrigerator, a refrigerating machine having a portion from which heat is to be dissipated, said portion being provided with a plurality of perimetric duct portions, a wall through which said duct portions extend, said wall having an inclined front portion connected to an upright wall of the refrigerator, said upright wall having a plurality of openings and a draft inducing impeller at the other side of said wall communicating with the exterior of the refrigerator, whereby a draft of air may be induced by said impeller to flow through the duct portions from one side of the wall to the other and to flow through the openings in the upright wall.

12. A refrigerator comprising a food compartment, a cooler within the same comprising a central duct member, outstanding fins upon said member, a sheet member connecting the outer edges of the fins, said fins and sheet member having upper and lower edges in spaced relation to the upper and lower walls of the compartment, whereby the fins and sheet member afford passages for the circulation of air to be cooled by fluid within the partition.

13. A refrigerator comprising a bipartite food compartment, a hollow, central partition in the same, a wall extending upwardly in said partition and dividing it into duct portions, said wall having a vertical extent less than that of the partition, means to supply a coolant to said duct portions whereby the coolant may be circulated upwardly and downwardly past the inner surfaces of the walls of said hollow partition.

14. A refrigerator comprising a food compartment, a liquid-containing cooler disposed below said compartment and in spaced relation thereto, freezing chambers associated with said cooler, a coolant receiving duct forming a wall of the food compartment, said duct communicating with the space above the cooler, said space and duct being arranged to cause the movement of the circulated coolant past the major portion of the exterior wall surface of the cooler.

15. A refrigerator comprising a bipartite food compartment, a hollow central partition in the same, and an intermediate substantially vertically disposed wall within the partition, said wall terminating below the top of the partition and dividing the same into two duct portions.

16. A refrigerator comprising a bipartite food compartment, a hollow central partition in the same, and an intermediate substantially vertically disposed wall within the partition, said wall terminating below the top of the partition, and dividing the same into two duct portions, a liquid-containing cooler below the partition, a freezing compartment associated with said cooler, an impeller disposed adjoining said cooler, partitioning arranged to cause the movement of a circulating coolant upwardly through one of the duct portions in the hollow partition and downwardly through the other duct portion thereof, the coolant from the hollow partition being directed by the partitioning in such a manner that it sweeps past the major portion of the exterior surface of the cooler before it returns to the hollow partition.

17. A refrigerator comprising a food compartment, a machine compartment, and freezing compartments, the freezing compartments and the machine compartment being associated with each other in one unit, and the food compartment being arranged in another unit, said units being assembled in operative relation to each other by their relative superimposition.

18. A refrigerator comprising a lower unit, said unit having a machine compartment, a liquid containing cooler disposed above the machine compartment and within said lower unit, and a freezing chamber disposed within said cooler, and a second unit arranged to be superimposed in operative relation upon the first described unit, said second unit comprising a food compartment and a fluid receiving duct forming a cooler for the latter, a portion of said duct being in the first unit, said duct portions being brought into registration when the units are superimposed.

19. A refrigerator comprising a lower unit, said unit having a machine compartment, a liquid containing cooler disposed above the machine compartment and within said lower unit, and a freezing chamber disposed within said cooler, and a second unit arranged to be superimposed in operative relation upon the first described unit, said second unit comprising a food compartment and a fluid receiving duct forming a cooler for the latter, a portion of said duct being in the first unit, said duct portions being brought into registration when the units are superimposed, and compressible sealing strips carried by the lower unit and arranged to be compressed to seal the registering duct portions when the units are thus superimposed.

20. A refrigerator comprising a refrigerating machine, a compartment enclosing the cold portion of the machine, a freezing chamber disposed within said compartment adjacent to the cold portion of the machine, a closure affording access to said chamber, a food compartment, means for conducting coolant from the vicinity of the cold portion of the machine to the food compartment whereby said coolant may receive heat from the food compartment without passing through the same, and a second closure affording access to the food compartment.

21. A refrigerator comprising a refrigerating machine having a cold end, a liquid-containing cooler receiving the cold end of the machine so that the liquid therein is brought to a low temperature, said cooler having re-entrant portions providing freezing chambers in direct heat transfer relation to said liquid, a food compartment, a fluid duct in heat transfer relation to said liquid-containing cooler, said duct extending into said food compartment, and means associated with said duct to cause the circulation of fluid therethrough, whereby said fluid may receive heat from the food compartment without passing through the same.

Signed by me at Springfield, Massachusetts, this 20th day of August, 1929.

IVAR LUNDGAARD.